(12) United States Patent
Chung et al.

(10) Patent No.: US 11,192,992 B2
(45) Date of Patent: *Dec. 7, 2021

(54) THERMOPLASTIC VULCANIZATES FOR FOAMING APPLICATIONS

(71) Applicant: ExxonMobil Chemical Patents Inc., Baytown, TX (US)

(72) Inventors: Oscar O. Chung, Houston, TX (US); Hui Hui Long, Shanghai (CN); Porter C. Shannon, Seabrook, TX (US); Toshiaki Yamaguchi, Kanagawa (JP); Weiqian Zhang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/474,990

(22) PCT Filed: Nov. 10, 2017

(86) PCT No.: PCT/US2017/061014
§ 371 (c)(1),
(2) Date: Jun. 28, 2019

(87) PCT Pub. No.: WO2018/125391
PCT Pub. Date: Jul. 5, 2018

(65) Prior Publication Data
US 2019/0322831 A1   Oct. 24, 2019

Related U.S. Application Data

(60) Provisional application No. 62/439,914, filed on Dec. 29, 2016.

(51) Int. Cl.
*C08J 9/32* (2006.01)
*C08J 9/00* (2006.01)

(52) U.S. Cl.
CPC .......... *C08J 9/0061* (2013.01); *C08J 9/0023* (2013.01); *C08J 9/0066* (2013.01); *C08J 9/0095* (2013.01); *C08J 9/32* (2013.01); *C08J 2201/024* (2013.01); *C08J 2201/026* (2013.01); *C08J 2201/03* (2013.01); *C08J 2203/22* (2013.01); *C08J 2323/16* (2013.01); *C08J 2423/12* (2013.01)

(58) Field of Classification Search
CPC ...... C08J 9/0061; C08J 9/0023; C08J 9/0066; C08J 9/0095; C08J 9/32; C08J 2201/024; C08J 2201/026; C08J 2201/03; C08J 2203/02; C08J 2323/16; C08J 2423/12; C08J 2203/14; C08J 2310/00; C08J 2423/16; C08J 9/0014; C08L 23/16
See application file for complete search history.

(56) References Cited

U.S. PATENT DOCUMENTS

| | | |
|---|---|---|
| 3,615,972 A | 10/1971 | Morehouse, Jr. et al. |
| 4,130,535 A | 12/1978 | Coran et al. |
| 4,311,268 A | 1/1982 | Soliven |
| 4,594,390 A | 6/1986 | Abdou-Sabet et al. |
| 5,177,147 A | 1/1993 | Spenadel et al. |
| 5,656,693 A | 8/1997 | Ellul et al. |
| 5,728,744 A | 3/1998 | Okada et al. |
| 6,042,260 A | 3/2000 | Heidemeyer et al. |
| 6,147,160 A | 11/2000 | Wang et al. |
| 6,235,394 B1 | 5/2001 | Shimazawa et al. |
| 6,235,800 B1 | 5/2001 | Kyuno et al. |
| 6,268,438 B1 | 7/2001 | Ellul et al. |
| 6,288,171 B2 | 9/2001 | Finerman et al. |
| 6,399,710 B1 | 6/2002 | Finerman et al. |
| 6,476,132 B1 | 11/2002 | Abdou-Sabet et al. |
| 6,582,633 B2 | 6/2003 | Elfving et al. |
| 6,713,520 B2 | 3/2004 | Sahnoune et al. |
| 6,720,361 B2 | 4/2004 | Tasaka et al. |
| 7,284,899 B2 | 10/2007 | Nakano |
| 7,294,675 B2 | 11/2007 | Hoyweghen et al. |
| 7,319,121 B2 | 1/2008 | Jacob |
| 7,326,471 B2 | 2/2008 | Shaw |
| 7,652,097 B2 | 1/2010 | Nonaka et al. |
| 7,829,623 B2 | 11/2010 | Ouhadi et al. |
| 7,964,672 B2 | 6/2011 | Ouhadi |
| 8,178,625 B2 | 5/2012 | Ellul et al. |
| 10,279,527 B2 | 5/2019 | Kerstetter, III et al. |
| 10,508,184 B2 | 12/2019 | Shannon et al. |
| 10,730,206 B2 | 8/2020 | Whelan et al. |
| 2006/0100377 A1 | 5/2006 | Ouhadi |
| 2007/0083007 A1 | 4/2007 | Jacob |
| 2007/0254971 A1* | 11/2007 | De Vogel ................ B29C 70/66 521/59 |
| 2008/0051516 A1 | 2/2008 | Hu et al. |
| 2008/0315159 A1 | 12/2008 | Minagoshi |
| 2009/0270525 A1 | 11/2009 | Yamamoto et al. |
| 2010/0119855 A1* | 5/2010 | Ouhadi ............... B29C 45/1657 428/515 |
| 2013/0072584 A1 | 3/2013 | Gopalan et al. |
| 2013/0101826 A1* | 4/2013 | Haug ........................ C08J 9/32 428/319.3 |
| 2016/0289410 A1 | 10/2016 | Yamaguchi et al. |
| 2016/0340480 A1* | 11/2016 | Kerstetter, III ......... C08L 23/16 |

FOREIGN PATENT DOCUMENTS

| | | |
|---|---|---|
| CN | 104072881 | 10/2014 |
| DE | 195 31 631 | 3/1997 |

(Continued)

*Primary Examiner* — Kara B Boyle (57) ABSTRACT

The present disclosure relates to TPV compositions suitable for foaming, as well as foamed TPV compositions, methods of making the foregoing, and applications of various foamed TPV compositions. The TPV compositions comprise an at least partially vulcanized rubber component dispersed within a thermoplastic component comprising a thermoplastic resin and a propylene-based elastomer, oil, and optionally one or more additives. According to some aspects, the TPV composition may be made in part by preloading some portion of process oil prior to addition of the curative. TPV compositions provided herein are particularly suitable for foaming with thermo-expandable microsphere foaming agents.

14 Claims, 4 Drawing Sheets

(56) References Cited

FOREIGN PATENT DOCUMENTS

| | | |
|---|---|---|
| EP | 1 838 739 | 10/2007 |
| JP | 1997-70913 | 3/1997 |
| JP | 1999-043551 | 2/1999 |
| JP | 2005-088718 | 4/2005 |
| JP | 3964669 | 12/2006 |
| JP | 2007-191544 | 8/2007 |
| JP | 2007-231181 | 9/2007 |
| JP | 2007-246578 | 9/2007 |
| JP | 2006-233085 | 9/2010 |
| JP | 2010-215684 | 9/2010 |
| JP | 4660016 | 3/2011 |
| JP | 5481278 | 4/2014 |
| JP | 5972200 | 12/2015 |
| KR | 20160083324 | 7/2016 |
| WO | 2004/016679 | 2/2004 |
| WO | 2010/050628 | 5/2010 |
| WO | 2010/062113 | 6/2010 |

* cited by examiner

THERMOPLASTIC VULCANIZATES FOR FOAMING APPLICATIONS

PRIORITY CLAIM

This application is a National Phase Application claiming priority to PCT Application Serial No. PCT/US2017/061014 filed Nov. 10, 2017, which claims the benefit of Provisional Application No. 62/439,914, filed Dec. 29, 2016, the disclosure of which is incorporated herein by reference.

CROSS REFERENCE TO RELATED APPLICATIONS

This application relates to concurrently filed Provisional Application No. 62/439,912, and entitled "Foaming Agent Masterbatches for Foaming Thermoplastic Vulcanizates."

FIELD OF THE INVENTION

This invention relates to thermoplastic vulcanizate compositions, and in particular to thermoplastic vulcanizate compositions suitable for foaming applications, foamed compositions and/or articles made therefrom, and methods of making such thermoplastic vulcanizate compositions, foamed compositions, and/or articles.

BACKGROUND OF THE INVENTION

Thermoplastic elastomers (TPE) are both elastomeric and thermoplastic. They are distinguished from thermoset rubbers which are elastomeric but not thermoplastic due to the cross-linking or vulcanization of the rubber, and are distinguished from general thermoplastics which are generally stiff and hard, but not elastomeric.

Thermoplastic vulcanizates (TPVs) are a class of TPE in which cross-linked rubber forms a dispersed, particulate, elastomeric phase within a thermoplastic phase of a stiff thermoplastic such that TPE properties are achieved. TPVs or TPV compositions are conventionally produced by dynamic vulcanization. Dynamic vulcanization is a process whereby a rubber component is crosslinked, or vulcanized, under intensive shear and mixing conditions within a blend of at least one non-vulcanizing thermoplastic polymer component at or above the melting point of that thermoplastic. Typically, the rubber component forms cross-linked, elastomeric particles dispersed uniformly in the thermoplastic. See, for example, U.S. Pat. Nos. 4,130,535; 4,311,268; 4,594,390; and 6,147,160. Dynamically vulcanized thermoplastic elastomers consequently have a combination of both thermoplastic and elastic properties. Conventional plastic processing equipment can extrude, inject, or otherwise mold, and thus press and shape TPV compositions into useful products alone or in composite structures with other materials.

TPEs and TPVs can be foamed by incorporating a modifier or filler or other components. See, for instance, WIPO Publications WO2004/016679 and WO2007/0044123. WO 2013/062685 suggests the use of thermo-expandable microspheres in creating foamed TPV compositions, asserting that such foamed compositions will have homogeneous closed cell structures, and may therefore exhibit superior relaxation performance, low water absorption, and desirably soft touch. Other references of potential interest along these and similar lines include: WIPO Publication WO2015/095987; U.S. Pat. Nos. 5,728,744, 6,268,438, 6,288,171, 6,399,710, 6,720,361, 6,713,520, 7,294,675, 7,319,121, 7,326,471, 7,652,097, 7,829,623, 7,964,672, and 8,178,625; US patent publications US2010/0119855, US2013/0101826, US2013/072584; Japanese patents JP5972200B, JP4660016B, JP3964669B, JP5481278B; Japanese Patent Publication No. 2005-088718; Chinese patent publication CN104072881A; Korean patent publication KR20160083324A; and Korean patent KR101013827B.

However, using thermo-expandable microspheres in foaming TPVs presents some challenges that have not yet been adequately addressed. Creating a foamed TPV with microspheres leads to a decrease in physical properties, especially tensile properties, of the TPV. When foaming with thermo-expandable microspheres, this decrease, interestingly, is roughly proportional to the decrease in specific gravity in the foamed TPV (relative to the non-foamed TPV). The present inventors have recognized that thermo-expandable microspheres do not behave like conventional chemical foaming agents when creating low-density TPV materials using such microspheres. In particular, a gas bubble is not formed (as is the case with typical chemical foaming) Instead, each thermo-expandable microsphere behaves somewhat akin to popcorn: in the unheated state, these materials are dense solids (e.g., specific gravity about 0.85 g/cc), but upon exposure to sufficient heat (precise temperature depending upon the type of microsphere and/or microsphere masterbatch used), the microsphere pops, forming a small, very low-density spherical particle of about 0.02 g/cc specific gravity. In this way, microsphere technology is more akin to forming a physical blend of high and low density components, than a conventional foam. Thus, although the shorthand "foam" and "foaming" may be used in the present application, when applied to such "popped" thermo-expandable microspheres (e.g., those having been exposed to sufficient heat to convert the micro-spheres to their low-density state), such terms could just as well be taken to mean a physical blend of high-density and low-density particles.

Thus, "foaming" with microspheres may present a unique opportunity to predict the properties of the resultant TPV, based upon the properties of the pre-foamed TPV. This means that the problem can be approached by formulating a TPV with relatively stronger physical properties. The most apparent solution to this problem would seem to be simply formulating the starting TPV to have such relatively stronger physical properties by conventional means, e.g., by adding additional thermoplastic to the formulation. However, adding additional thermoplastic to the TPV formulation also increases the hardness of the TPV. Increased hardness is undesirable in many foamed TPV applications; for instance, installing or using foamed TPV articles frequently involves bending, flexing, or otherwise distorting the TPV article (e.g., to fit it into a particular application, as is done when bending weatherseals, glass run channels, or other automotive components made from TPVs, to fit into their respective configurations in the automobile). When the TPV is too hard, it will tend to stress-whiten or show other undesired deformations. Therefore, it would be highly desirable to increase tensile properties without substantially increasing hardness in the TPV, for use in applications involving foaming with thermo-expandable microspheres.

SUMMARY OF THE INVENTION

The present invention in some aspects relates to TPV compositions, and methods of making such compositions, in which physical properties (e.g., tensile strength) are improved without significantly increasing hardness. These compositions may be particularly well suited to foaming, especially with thermo-expandable microspheres.

Thus, in some embodiments, the present invention provides methods for making TPVs. Such methods may include introducing a TPV formulation comprising rubber, thermoplastic resin, propylene-based elastomer ("PBE"), one or more additives (e.g., fillers), process oil, and curative to an extrusion reactor. The additives can include fillers, as noted, and/or may also include cure accelerators and the like. A first portion of the process oil is introduced before the curative (e.g., at a location in the extrusion reactor upstream of the curative injection point, and/or by pre-blending ingredients with the oil before adding curative, or the like). The remaining portion of the process oil is introduced together with the curative (e.g., as may be the case with a phenolic resin curative mixed with oil), and/or after the curative. This "preloading" of oil during formation of the TPV may enhance physical properties (e.g., ultimate tensile strength, ultimate elongation, modulus at 100% elongation ("M100")) without noticeably increasing hardness. Similarly, the inclusion of the PBE provides stronger physical properties while minimizing increase in hardness of the resulting TPV composition. The rubber is dynamically vulcanized with the curative in the presence of the thermoplastic resin and the propylene-based elastomer to form the thermoplastic vulcanizate composition that has a rubber phase that is dispersed and at least partially cross-linked within a continuous thermoplastic component that comprises the thermoplastic resin and the propylene-based elastomer.

Accordingly, the TPV compositions of various embodiments may comprise, consist essentially of, or consist of: (a) an at least partially vulcanized rubber component dispersed within a continuous thermoplastic component comprising thermoplastic resin and propylene-based elastomer; (b) process oil; and (c) one or more additives (e.g., one or more fillers or other additives as noted above). The rubber component may comprise any cross-linkable (prior to vulcanization) and/or cross-linked (after vulcanization) rubber; ethylene-α-olefin copolymers such as ethylene-propylene (EP) copolymers are preferred, with ethylene-propylene-polyene terpolymers (such as ethylene-propylene-diene or "EPDM" terpolymers) being particularly preferred. The thermoplastic resin is preferably a thermoplastic polyolefin, with polypropylene being a preferred example of such; however, other thermoplastic resins may be used instead of, or with, a polyolefin such as polypropylene. In some embodiments, it is preferred that any thermoplastic resin(s) have MFR of 15 g/10 min (ASTM D-1238; 230° C. and 2.16 kg mass) or less, more preferably 10 or less, 5 or less, 3 or less, or even 1 or less, in some embodiments. MFR of such thermoplastic resins may be at least 0.01 or 0.1 g/10 min, such as at least 0.5 g/10 min. That is, higher molecular weight thermoplastic resins are preferred for such embodiments. The PBE preferably has at least 60 wt % propylene-derived units and about 5 to 25 wt % units derived from a $C_2$ or $C_4$-$C_{12}$ α-olefin (preferably ethylene), based on total weight of the propylene-based elastomer, and a heat of fusion of less than about 80 J/g. In some embodiments, the PBE may also desirably have low MFR, e.g., 10 or less, more preferably 5 or less, such as within the range from 1 to 5 or 2 to 4.

According to certain embodiments, it is preferred to form the TPV composition without foaming agent(s) in the ingredients; the TPV composition may afterward be further processed by blending, co-extrusion, or the like, with foaming agents in order to create a foamed TPV composition according to some embodiments.

Thus, the invention in some embodiments provides foamed TPV compositions and/or articles made therefrom, as well as methods to make such compositions and/or articles. For instance, methods of some embodiments include blending a TPV (such as a TPV comprising the components (a)-(c) just noted, and/or formed by methods in accordance with those described above) with foaming agent so as to reduce the density of the TPV. Preferably, the foaming agent comprises thermo-expandable microspheres; more preferably, the foaming agent comprises a masterbatch comprising 5 to 95 wt % thermo-expandable microspheres in carrier polymer. The foaming agent in some embodiments may consist of thermo-expandable microspheres (or masterbatches thereof).

And, some embodiments accordingly include foamed TPV compositions and/or articles made from foamed TPV compositions, wherein the foamed TPV composition has specific gravity (ASTM D-792) within the range from 0.40 g/cc to 0.80 g/cc, such as within the range from 0.60 to 0.75 g/cc. The foamed TPV composition's physical properties, and in particular its tensile properties, will vary depending upon the specific gravity to which the TPV is foamed. However, foamed TPV compositions according to some embodiments, when foamed to specific gravity within the range from 0.68 to 0.70 g/cc, may exhibit one or more of the following properties: M100 (ASTM D-412, Die C) of 3.00 MPa or greater (such as within the range from 3.00 to 3.75 MPa), ultimate tensile strength (ASTM D-412, Die C) of at least 2.50, such as within the range from 2.50 to 6.00 MPa, and tension set (22 hrs, 70° C.) of at least 70%, such as within the range from 70% to 100%.

DETAILED DESCRIPTION OF SPECIFIC EMBODIMENTS

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Definitions

As used herein, a "polymer" may be used to refer to homopolymers, copolymers, interpolymers, and terpolymers. Homopolymers are polymers made from a single type of monomer (e.g., homopolypropylene, made from propylene). Unless context indicates otherwise, "copolymers" may refer to polymers made from two or more types of monomers (including both, e.g., ethylene-propylene copolymers and ethylene-propylene-polyene terpolymers, as well as tetrapolymers, and polymers made from 5 or more monomer types); and "terpolymers" refer to a sub-set of copolymers made from three monomer types (e.g., ethylene-propylene-polyene terpolymers).

As used herein, when a polymer is referred to as comprising a monomer, the monomer is present in the polymer in the polymerized form of the monomer or in the derivative form of the monomer.

As used herein, when a polymer composition or blend is said to comprise a certain percentage, wt %, of a monomer, that percentage of monomer is based on the total amount of monomer units in all the polymer components of the composition or blend, unless otherwise stated.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)," unless noted otherwise.

As used herein, a "$C_x$" hydrocarbon or α-olefin or the like, where x is an integer, refers to a hydrocarbon, α-olefin, or the like having X carbon atoms. Thus, a $C_6$ α-olefin is an α-olefin having 6 carbon atoms (with a double bond connecting the 1 and 2 carbons). Similarly, a "$C_x$-$C_y$ α-olefin" or a "$C_{x-y}$ α-olefin" is an α-olefin having from x to y carbon atoms, inclusive (e.g., a $C_6$-$C_{10}$ or $C_{6-10}$ α-olefin is an α-olefin having 6, 7, 8, 9, or 10 carbon atoms).

As used herein, a composition "free of" a component refers to a composition substantially devoid of the component, or comprising the component in an amount of less than about 0.01 wt. %, by weight of the total composition.

As used herein, a "thermoplastic vulcanizate" is broadly defined as any material that includes a dispersed, at least partially vulcanized, rubber component within a thermoplastic resin component. A thermoplastic vulcanizate material can further include additive oil, other ingredients, other additives, or combinations thereof.

As used herein, the term "vulcanizate" means a composition that includes some component (e.g., rubber) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber component blended with a thermoplastic resin component under conditions of shear at temperatures sufficient to plasticize the mixture. In at least one embodiment, the rubber component is simultaneously crosslinked and dispersed as micro-sized particles within the thermoplastic resin component. Depending on the degree of cure, the rubber component to thermoplastic resin component ratio, compatibility of the rubber component and thermoplastic resin component, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 10, 20, 30, or 50 wt % (in varying embodiments) of the crosslinkable rubber is extractable from the specimen of the TPV in boiling xylene (said wt % based upon the total weight of rubber present in the TPV specimen). The percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in Column 4, lines 19-50 of U.S. Pat. No. 4,311,628, which description is hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber, less than 4, 3, 2, or even 1 wt % of the crosslinkable rubber is extractable from the specimen of the TPV in boiling xylene. In some embodiments, in a TPV comprising a fully vulcanized rubber, from 0.5 to 2.0 wt %, such as from 0.1 to 2.0 wt %, of the crosslinkable rubber is extractable from the specimen of the TPV in boiling xylene.

As used herein, "extender oil" and "processing oil" may have similar compositions, or be selected from the same or similar compounds. The terms are used to distinguish the timing in the manufacturing cycle of elastomeric compositions (including TPVs) at which the oil is introduced. "Extender oil" is oil that is added to or otherwise incorporated with an elastomer following its polymerization, e.g., incorporated (along with any other desired additives) as part of the elastomer pellets, bales, or the like that are shipped or otherwise provided to downstream manufacturers, who in turn process the elastomer into intermediate products (including TPVs) and/or finished goods. "Processing oil" or "process oil" is formulated with the elastomer during such downstream manufacturing (e.g., during extrusion, mixing, or other processing of the elastomer, including formation into a TPV). Thus, in the context of thermoplastic vulcanizate compositions, such as those discussed herein, "extender oil" may be present in a rubber component used in manufacturing the TPV; "process oil" is oil that is added during the TPV manufacturing process. Sometimes, the total of both extender oil and process oil may be cumulatively referred to as "additive oil."

As used herein, a "Group I oil", a "Group II oil", a "Group III oil", a "Group IV oil" (also referred to as a polyalphaolefin or "PAO") and a "Group V oil" refer to the respective base stock oil group as understood in accordance with the American Petroleum Institute (API)'s categorization of base stock oils (set forth in Annex E of API 1509, 17th Edition, Addendum 1 (March 2015), incorporated herein by reference). For instance, a Group I oil is a petroleum-derived base oil or basestock oil having less than 90 wt % saturates (as determined in accordance with ASTM D2007), greater than 300 wppm sulfur (as determined in accordance with ASTM D1552, ASTM D2622, ASTM D3120, ASTM D4294, or ASTM D4297, with ASTM D4294 prevailing in case of conflicting results among those methods), and having a viscosity index ranging from 80 to 120 (as determined by ASTM D2270). Likewise, a Group II oil is a petroleum-derived base oil or basestock oil having greater than or equal to 90 wt % saturates, less than or equal to 300 wppm sulfur content, and a viscosity index ranging from 80 to 120 (each property determined by the same methods identified for Group I oils). Group III, IV, and V oils are similarly in accordance with their description in Annex E of API 1509.

Thermoplastic Vulcanizate

Thermoplastic vulcanizate (TPV) compositions of various embodiments may comprise, consist essentially of, or consist of: (a) an at least partially vulcanized rubber component dispersed within a continuous thermoplastic matrix comprising thermoplastic resin and propylene-based elastomer; (b) oil; and, optionally, (c) one or more additives (e.g., one or more fillers, foaming agents, or the like). As used in this context, "consist essentially of" means that the TPV composition is free of other materials except those minor impurities (e.g., 0.1 wt % or less) that one would typically expect in normal commercial operations. For instance, a single process line may be used to in a continuous process to create multiple different types of materials in series, and some residuals (e.g., residual polymer, monomer, curative, additives, or other material) from previous product campaigns may acceptably be left in such equipment.

Such TPVs are formed by dynamically vulcanizing a TPV formulation. The TPV formulation of various embodiments comprises (i) a rubber component (which may or may not be oil-extended), (ii) a thermoplastic resin, (iii) a PBE, (iv) a vulcanizing agent or curative; (v) processing oil; and (vi) optionally, one or more additives (including, e.g., cure accelerators, metal oxides, acid scavengers, flame retardants, fillers, stabilizers, and the like). The TPV may therefore alternatively be considered the product of dynamic vulcanization of the TPV formulation.

Formation of the TPV and its resultant properties will first be described, followed by a more detailed description of suitable rubber components, thermoplastic components, vulcanizing agents, processing oil, and additives.

Forming TPVs

As those skilled in the art appreciate, dynamic vulcanization includes a process whereby a rubber that is undergoing mixing with a thermoplastic resin is cured. The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (e.g., the TPV formulation) undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization of the TPV formulation takes place within a reactor, such as an extruder, melt-mixer, or other reactive mixing device (described in more detail below). Furthermore, not all components of the TPV formulation need necessarily be introduced to the reactor at the same time.

For instance, dynamic vulcanization according to some embodiments proceeds as follows: The rubber component, thermoplastic component, and PBE are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend. The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative, or after dynamic vulcanization—or at any two or more of the foregoing points in the process.

Methods according to particular embodiments include "preloading" process oil—meaning that a portion of the process oil is introduced to the TPV formulation before the curative is introduced. Surprisingly, it was found that some degree of oil preloading resulted in increased tensile properties of the resulting TPV, without increasing hardness.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, or at least 50 wt %, of the total process oil used in forming the TPV is preloaded (i.e., introduced before the curative). In some embodiments, the amount of preloaded process oil is within the range from 15 to 60 wt %, such as 20 to 60 wt %, preferably 25 to 60 wt %, such as 25 to 55 wt %, 30 to 50 wt %, or 35 to 45 wt %, with ranges from any of the foregoing low ends to any of the foregoing high ends also contemplated in various embodiments. These wt %s are based on total weight of process oil added to the TPV (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Practice of such embodiments of the present invention is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

Rubber Component

The rubber component of TPV formulations of various embodiments is preferably a crosslinkable (vulcanizable) rubber component, such that upon dynamic vulcanization, the rubber component in the resulting TPV composition (i.e., resulting from processing, including by dynamic vulcanization, of the TPV formulation) of such embodiments is at least partially crosslinked, preferably fully crosslinked.

Any rubber suitable for use in the manufacture of TPVs can be used to manufacture (and be present in) the TPV compositions of some embodiments of the present invention. The term "rubber" refers to any natural or synthetic polymer exhibiting elastomeric properties, any may be used herein synonymously with "elastomer." The rubber component may comprise one rubber, or a mix of two or more rubbers.

For example, the rubber component can be any olefin-containing rubber such as ethylene-propylene copolymers (EPM), including in particular saturated compounds that can be vulcanized using free radical generators such as organic peroxides, as described in U.S. Pat. No. 5,177,147. Other rubber components can include ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms.

The rubber component can also be a butyl rubber. The term "butyl rubber" includes a polymer that predominantly includes repeat units from isobutylene, but also includes a few repeat units of a monomer that provides a site for crosslinking. Monomers providing sites for crosslinking include a polyunsaturated monomer such as a conjugated diene or divinyl benzene. In one or more embodiments of the invention, the butyl rubber polymer can be halogenated to further enhance reactivity in crosslinking. Those polymers are referred to as "halobutyl rubbers."

Further, the rubber component can be homopolymers of conjugated dienes having from 4 to 8 carbon atoms and rubber copolymers having at least 50 wt % repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

A list of preferred rubber component include, but are not limited to, ethylene-propylene rubber, ethylene-propylene-diene rubber, natural rubber, butyl rubber including halobutyl rubber, halogenated rubber copolymer of p-alkylstyrene and at least one isomonoolefin having 4 to 7 carbon atoms, a copolymer of isobutylene and divinylbenzene, a rubber homopolymer of a conjugated diene having from 4 to 8 carbon atoms, a rubber copolymer having at least 50 wt. % repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereon.

The rubber component is preferably present in the TPV formulation (and/or present in the resulting TPV) in an amount within the range from 10 to 40 wt %, preferably 15 to 30 wt %, such as 16 to 28 wt %, based on total weight of the TPV, with ranges from any of the foregoing low ends to any of the foregoing high ends also contemplated in various embodiments. Note that these wt % values for rubber component are exclusive of any extender oil that may be formulated with the rubber component (e.g., for ease of processing). The TPV formulation (and/or resulting TPV composition) of some embodiments may optionally comprise 5 to 30 wt %, such as 10 to 25 wt % or 12 to 24 wt % (with ranges from any of the foregoing lows to any of the foregoing highs also contemplated) of extender oil, where extender oil is present in the rubber component.

Alternatively, the rubber component amount in the TPV composition may be expressed in terms of wt % inclusive of any extender oil that may be present in the rubber component. In such cases, the rubber component (inclusive of extender oil) may be present in the TPV composition within the range from 15 to 60 wt %, preferably 20 to 50 wt %, such as 30 to 45 wt % (again, with ranges from any of the foregoing lows to any of the foregoing highs also contemplated in various embodiments).

Thermoplastic Resin

The TPV formulations and/or TPV compositions of various embodiments include at least one olefinic thermoplastic resin. The thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers.

Illustrative thermoplastic resins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked in the resulting TPV (i.e., it is non-vulcanizable or non-crosslinkable as present in the TPV formulation, prior to dynamic vulcanization).

In preferred embodiments, the olefinic thermoplastic resin comprises, or consists of, polypropylene. The term "polypropylene" as used herein broadly means any polymer that is considered a "polypropylene" by persons skilled in the art and includes homopolymers as well as impact, random, and other copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from one or more olefins selected from the group consisting of ethylene and $C_4$-$C_{10}$ α-olefins.

The thermoplastic resin may have a melting temperature of at least 110° C., or at least 120° C., or at least 130° C., and may range from 110° C. to 170° C. or higher as measured by differential scanning calorimetry (DSC) as described later in this application in connection with the propylene-based elastomer.

In some embodiments, the thermoplastic resin has MFR of 15 g/10 min or less, more preferably 10 or less, 5 or less, 3 or less, or even 1 or less, in some embodiments (measured per ASTM D-1238, at 230° C. and 2.16 kg mass). For instance, MFR of the thermoplastic resin may be within the range from a low of any one of 0.01, 0.1, and 0.5 g/10 min to a high of any one of 1, 3, 5, 10, and 15 g/10 min (ASTM D-1238, 230° C. and 2.16 kg). In certain of these embodiments, the thermoplastic resin component comprises only thermoplastic resin with MFR according to the foregoing description.

In yet other embodiments, however, the TPV composition (and/or the TPV formulation) may comprise two or more thermoplastic resins. In particular, the TPV composition may comprise (i) a thermoplastic resin having MFR of 15 g/10 min or less (or other MFR per the just-given description); and (ii) a high-MFR thermoplastic resin having MFR of greater than 15 g/10 min, for instance, within the range from greater than 15 to 50 g/10 min, preferably within the range from greater than 15 to 25 g/10 min, such as 16 to 24 g/10 min. The high-MFR thermoplastic resin may otherwise be in accordance with the above-given descriptions of suitable thermoplastic resins (e.g., with respect to monomeric constituents, melting temperature, and the like). In certain of these embodiments employing multiple thermoplastic resins, the TPV composition and/or formulation preferably includes more low-MFR thermoplastic resin than high-MFR thermoplastic resin. For instance, of the combined weight of the low-MFR and high-MFR thermoplastic resin, 51 to 99 wt % is low-MFR, such as 55 to 95 wt %, or 55 wt % to 75 wt %, with the balance being the high-MFR thermoplastic resin.

In summary, then, TPV compositions and/or formulations according to some embodiments include a first (low-MFR) thermoplastic resin and optionally a second (high-MFR) thermoplastic resin, such that the second thermoplastic resin is present at 0 wt % to 49 wt % of the combined amount of first and second thermoplastic resin. Where the second thermoplastic resin is present, it is preferably present within the range of 1 wt % to 49 wt %, such as 5 to 49 wt %, or 10 to 35 wt %, such as 12 to 33 wt %, of the combined amount of first and second thermoplastic resin (with ranges from any of the foregoing lows to any of the foregoing highs, e.g., 1 to 33 wt %, also contemplated in various embodiments).

The combined amount of thermoplastic resin or resins (where two or more thermoplastic resins are used) in the TPV composition (and/or the TPV formulation used to form the TPV composition) may be within the range from 10 to 40 wt %, preferably as 15 to 30 wt %, such as 17 to 25 wt %, with ranges from any of the foregoing low ends to any of the foregoing highs ends also contemplated in various embodiments, and with such wt % based on the total mass of the TPV composition (or TPV formulation, as applicable).

Propylene-Based Elastomer

The PBE is present in the TPV formulation (and/or resulting TPV composition) of some embodiments within the range from 3 to 20 wt %, preferably from 4 to 15 wt %, such as 4 to 12 wt % or 5 to 10 wt %, with ranges from any of the foregoing lows to any of the foregoing highs also contemplated in various embodiments. Although it is possible to blend (e.g., coextrude, melt-mix or the like) PBE with a vulcanized TPV material to form the resulting TPV, it is preferred that the PBE be present in the TPV formulation prior to dynamic vulcanization (that is, preferred TPVs are formed such that the PBE is present in the TPV formulation at the time of dynamic vulcanization, and preferred methods include dynamic vulcanization in the presence of the PBE).

Preferred PBEs are those in accordance with the propylene-based elastomer described in Paragraphs [0055]-[0075] of WIPO Patent Publication No. WO 2015/095987 having international filing date 24 Dec. 2013, which description is incorporated by reference herein. As set forth therein, the PBE preferably has reduced crystallinity and/or melting point as compared to highly isotactic polypropylene due to introduction of errors in the insertion of propylene. The PBE is generally devoid of any substantial intermolecular heterogeneity in tacticity and comonomer composition, and also generally devoid of any substantial heterogeneity in intramolecular composition distribution.

Particularly preferred PBEs in accordance with that description for use in embodiments of the present invention include copolymers of propylene and one or more comonomers selected from the group consisting of ethylene and $C_4$-$C_{10}$ α-olefins; most preferred are propylene-ethylene copolymers. The PBE has at least 60 wt % units derived from propylene (based on total mass of the PBE), such as within the range from a low of any one of 60, 65, 70, 75, 80, 84, and 85 wt % to a high of any one of 85, 90, 92, 94, and 95 wt %, provided the high end of the range is greater than the low end. The balance of the PBE is preferably derived from ethylene, although in some embodiments the PBE may include one or $C_4$-$C_{10}$ comonomers instead of or in addition to ethylene.

Preferred PBEs have one or more, preferably two or more or three or more, most preferably four or more, or all, of the following properties:

MFR of 1 to 20 g/10 min (ASTM D-1238, 230° C. and 2.16 kg). Most preferably, however, MFR of the PBE is within the range from 1 to 10, more preferably within the range from a low of 1 or 2 g/10 min to a high of 4 or 5 g/10 min;

Melting point $T_m$ as determined by DSC of 105° C. or less, such as within the range from 25° C., 60° C., 70° C., or 90° C. to 105° C.;

Heat of fusion ($H_f$) as determined by DSC of 80 J/g or less, such as within the range from a low of any one of 1, 3, 5, 6, and 7 J/g to a high of any one of 30, 35, 40, 45, 50, 60, 70, 75, and 80 J/g;

Triad tacticity of three propylene units, as measured by $^{13}C$ NMR, of at least 75%, such as within the range from 75, 80, 82, or 85% to 97% or 99%; and Density of 0.850 g/cc to 0.900 g/cc (measured at room temperature per ASTM D1505).

The DSC procedures for determining $T_m$ and $H_f$ include the following. The polymer is pressed at a temperature of from 200° C. to 230° C. in a heated press, and the resulting polymer sheet is hung, under ambient conditions (of 20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C. It is measured in Joules and is a measure of the $H_f$ of the polymer. $T_m$ is the temperature of greatest heat absorption (i.e., the temperature corresponding to the highest peak) in the range of melting during the first melt cycle.

Some embodiments may include one or more different PBEs, i.e., propylene-based elastomers each having one or more different properties such as, for example, different comonomer or comonomer content. Such combinations of various propylene-based elastomers are all within the scope of the invention.

Examples of the propylene-based elastomers may be those available commercially under the trade names VIS-TAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials. In particular embodiments, oil included in the TPV is selected based on API groupings (e.g., a API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from ChevronTexaco Corp.). Also or instead, the oil could include white oil (e.g., pharmaceutical grade oil, such as Primol™ 542 medicinal grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation and/or present in the TPV composition in amounts within the range from 5 to 40 wt %, preferably 10 to 30 wt %, such as 15 to 25 wt %, such wt % s based on total weight of the TPV formulation or TPV composition, as applicable, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation or TPV composition, as applicable), with ranges from any of the foregoing lows to any of the foregoing highs also contemplated.

Total additive oil (extender oil+process oil) may therefore be within the range from 5 to 350 phr (or 5 to 70 wt % based on total weight of TPV formulation or TPV composition, as applicable); preferably within the range from 150 to 250 phr (or 30 to 45 wt % based on total weight of TPV formulation or TPV composition).

Cure Agents

The TPV formulation also includes a vulcanizing agent, which may be at least in part consumed during dynamic vulcanization of the TPV formulation. Any vulcanizing agent that is capable of curing or crosslinking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046]-[0054] of PCT Application No. PCT/US15/65048, filed Dec. 10, 2015, which description is herein incorporated by reference.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, the TPV composition may include reinforcing and non-reinforcing fillers, antioxidants, stabilizers, anti-blocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV formulation and/or composition includes at least 5, 6, 7, 8, 9, or 10 wt % of one or more fillers, such as calcium carbonate, clays, silica, talc, titanium dioxide, carbon black, and blends thereof, based on the weight of the TPV formulation or composition, as applicable. In preferred embodiments, the TPV formulation and/or composition includes clay and/or carbon black in an amount ranging from a low of any one of 5, 6, 7, 8, 9, or 10 to a high of any one of 15, 16, 17, 18, 19, or 20 wt % based on the total weight of the TPV formulation or TPV composition, as applicable. In one or more embodiments, the TPV composition or formulation comprises antioxidants in an amount less than or equal to 5 wt %, or 4 wt %, or 3 wt %, or 2 wt %, or 1 wt %, or 0.5 wt %, based on the total weight of the TPV composition or formulation.

TPV Composition Properties

TPV compositions according to various embodiments have specific gravity within the range from 0.910 to 0.980 g/cc, for instance from 0.930 to 0.975 g/cc, as measured in accordance with ASTM D-792. Further, such TPV compositions preferably have hardness (Shore A, measured per ASTM D2250 with 15 sec. delay) within the range from 75 to 90, such as 80 to 87, more preferably 82 to 86, with ranges from any of the foregoing lows to any of the foregoing highs also contemplated according to various embodiments.

In addition, the TPV compositions of various embodiments exhibit one or more of the following properties (particularly where the TPV composition has hardness within the range from 82 to 86 (Shore A)):
- Modulus at 100% elongation ("M100") within the range from 7 to 12 MPa, preferably 8 to 11 or 9 to 10 MPa, with ranges from any of the foregoing lows to any of the foregoing highs also contemplated in various embodiments;
- Ultimate tensile strength (UTS) of at least 7 MPa, such as within the range from 7 to 15, for instance 8 to 12 or even 9 to 11 MPa, with ranges from any of the foregoing lows to any of the foregoing highs also contemplated in various embodiments; and
- Ultimate elongation (UE) within the range from 500% to 800%, such as 550% to 750%, or 560% to 650%, with ranges from any of the foregoing lows to any of the foregoing highs also contemplated in various embodiments.

M100, UTS, and UE for non-foamed compositions are measured on injection molded plaques according to ASTM D-412 (Die C) at 23° C. (unless otherwise specified) at 50 mm per minute by using an Instron testing machine.

As noted previously, when foaming such TPV compositions, particularly with thermo-expandable microspheres, so as to obtain foamed TPV compositions of reduced gravity, it is anticipated that the foregoing tensile properties will be proportionally reduced with specific gravity.

Foamed TPV Compositions

Although foaming agents are one of the potential additives suitable for inclusion in the TPV formulation, according to some embodiments, it is preferred to first obtain a TPV composition that does not include foaming agent, and then to blend such TPV composition with foaming agent, particularly where the foaming agent comprises thermo-expandable microspheres. Alternatively, if some amount of conventional foaming agent is present in the TPV composition, then such embodiments may optionally include combining the TPV with additional foaming agent.

Regardless of how the foaming agent is introduced to and/or blended with the TPV composition, methods of some embodiments include: (i) combining 90-99.9 wt % (such as 95 to 99.5 wt %, or 97.5 to 99 wt %) TPV composition with 0.1-10 wt % (such as 0.5 to 5 wt %, or 1 to 2.5 wt %) foaming agent (such wt % s based on the mass of TPV and foaming agent combined, and exclusive of any other optional ingredients combined therewith), and (ii) forming a foamed TPV composition therefrom. The foaming agent preferably comprises or consists of thermo-expandable microspheres; and relative amounts of TPV composition and foaming agent may be within any range from any of the just-noted low ends to any of the just-noted high ends. Further additives may optionally be included in the combining (i)—for instance, such further additives may include any additive(s) noted above for inclusion in a TPV formulation (with the caveat just noted regarding foaming agents, per some embodiments). The TPV composition may be in accordance with any of the above-described TPV compositions, and/or it may be formed according to any of the above-described methods.

Forming the foamed TPV composition may include the use of any discrete molding or continuous extrusion means for forming and shaping polyolefins known in the art. Some of these means may advantageously also serve the function of combining the TPV composition and foaming agent (and any optional further additives). For instance, coextrusion of TPV composition and foaming agent may be used both (i) to combine these components and (ii) to form the foamed TPV composition. Alternatively, however, the components may be combined beforehand, e.g., in a blender, melt-mixer, or the like, and then fed to an extruder or other like apparatus for forming the foamed composition.

Examples of suitable molding or continuous extrusion means include: sheet extrusion, profile extrusion or co-extrusion, compression molding, injection molding, co-injection molding, gas-assisted injection molding, transfer molding, foam molding, transfer molding, vacuum forming, lamination, calendering, or other forms of processing such as described in, for example, "Rubber Technology," by Maurice Norton (Van Nostrand Reinhold—New York), or combinations thereof. Among these, extrusion including co-extrusion is particularly suitable for forming the foamed material of various embodiments of the present invention.

Foamed TPV compositions of various embodiments may have specific gravity within the range from 0.40 g/cc to 0.80 g/cc, such as within the range from 0.60 to 0.75 g/cc, or 0.68 to 0.70 g/cc, with ranges from any of the foregoing lows to any of the foregoing highs also contemplated in various embodiments.

The foamed TPV composition's physical properties, and in particular its tensile properties, will vary depending upon the specific gravity to which the TPV is foamed. However, foamed TPV compositions according to some embodiments, when foamed to specific gravity within the range from 0.68 to 0.70 g/cc, may exhibit one or more (preferably two or more, such as all) of the following properties:

Modulus at 100% elongation ("M100") within the range from 3.00 to 3.75 MPa. The M100 measures the force required to maintain a sample of the foamed TPV composition at 100% elongation, per cross-sectional area of the un-elongated sample. It indicates the degree of flexibility/stiffness of the article; a balance between excessive flexibility and excessive stiffness is desired for many foamed TPV applications;

Ultimate tensile strength (UTS) of at least 2.5 MPa, such as within the range from 2.50 to 6.00 MPA. UTS indicates the tensile strength of a sample upon breakage after being stretched at a specified rate until breakage; and Tension Set (TS) measured per ASTM D-412 (Die C, 100% strain for 22 hrs at 70° C., quiescent relaxation for at least 12 hours) of at most 90%, preferably at most 85%, or at most 82%, such as within the range from 50% to 80%, or 55% to 75%, with ranges from any of the foregoing lows to any of the foregoing highs also contemplated in various embodiments. Tension Set measures both the elastic stretch and recovery capabilities of the foamed TPV composition by measuring elongation remaining in a compression-molded specimen after it has been stretched and allowed to recover per the procedures of ASTM D-412 as summarized above. For instance, a 50% TS value means that starting with a 1-inch length sample, after straining to 2 inches (a 100% strain), the sample shrinks back to 1.5 inches. Lower values are preferred, indicating less permanent deformation resulting from the exerted strain at the recited conditions.

M100 and UTS for foamed compositions are both measured on extruded tapes (e.g., tapes formed by coextruding TPV composition with foaming agent); such measurement is carried out according to the procedures of ASTM D-412 (Die C) at 23° C. (unless otherwise specified) at 50 mm per minute by using an Instron testing machine.

Foaming Agents

As noted previously, preferred foaming agents for use in various embodiments include thermo-expandable microspheres. A thermo-expandable microsphere is broadly defined as a microsphere comprising a polymer shell and a propellant encapsulated therein. Examples are known in the art and described in, for example, U.S. Pat. Nos. 6,582,633 and 3,615,972, WO 99/46320 and WO 99/43758, and contents of which hereby are incorporated by reference. Examples of such thermo-expandable microsphere include, for example, EXPANCEL™ products commercially available from Akzo Nobel N.V., such as EXPANCEL™ 950 MB80 (a masterbatch containing microcapsules in ethylene vinyl acetate (EVA) copolymer carrier).

A polymer shell is any shell-like structure made from a polymer. It can be hollow, filled, or partially filled such as with a propellant. The propellant can be any liquid having a boiling temperature not higher than the softening temperature of the thermoplastic polymer shell. Expansion of the thermoplastic microspheres is typically physical by nature. It is believed that as the propellant is heated up, the propellant expands, increases the intrinsic pressure, at the same time the shell softens, thus causes the microspheres' expansion, normally from about 2 to about 8 times their diameter, or about 30 to about 80 times volume, and the thickness of polymer shell may decrease to 0.1 μm or even thinner Factors that may affect the expandability of the microspheres include volatility of the encapsulated propellant, gas permeability, and viscoelasticity of the polymer shell.

Various monomers are suitable for preparation of the polymer shell and may comprise acrylonitrile, methacrylonitrile, α-haloacrylonitrile, α-ethoxyacrylonitrile, fumaric nitrile, acrylic esters or any combinations thereof. In one preferable embodiment, the monomer is made from polyacrylonitrile. The polymer shell may have a softening temperature, i.e., the glass transition temperature (Tg) ranging from about 80° C. to about 200° C.

The liquids suitable for preparation of the propellant of the thermo-expandable microsphere usually have a boiling point lower than the softening temperature of the polymer shell at atmosphere pressure. Suitable liquids include, but not limited to, isobutane, 2,4-dimethylbutane, 2-methylpentane, 3-methylpentane, n-hexane, cyclohexane, heptane, isooctane, or any combinations thereof.

When a thermo-expandable microsphere is heated up, it starts to expand at a certain temperature. The temperature at which the expansion starts is called $T_{start}$, while the temperature at which the maximum expansion is reached is called $T_{max}$. The $T_{start}$ and $T_{max}$ can be measured by thermo mechanical analysis (TMA) of thermo expansion property. Suitable thermo-expandable microspheres may have a $T_{start}$ of at least about 100° C., preferably at least about 110° C., 120° C., 130° C., or even 140° C., and a $T_{max}$ of less than 300° C., more preferably less than about 260° C., 240° C., 220° C., or 210° C.

Thermo-expandable microspheres suitable for foamed TPV compositions of some embodiments may have various pre-expansion average particle sizes. In some embodiments, the average particle size may range from about 1 μm to about 500 μm, preferably from about 2 μm to about 300 μm, more preferably from about 4 μm to about 100 μm, and most preferably from about 5 μm to about 50 μm. The average particle size of the expandable microsphere, after expansion, is preferably not less than about 50 μm, preferably no less than about 80 μm, more preferably no less than about 100 μm, and most preferably not less than about 120 μm.

The production of thermo-expandable microsphere can be any methods comprising a step of polymerizing the monomers in an aqueous suspension in the presence of a propellant, and are known as described in the earlier publication, for example, U.S. Pat. No. 3,615,972, WO 99/46320, and WO 99/43758, and contents of which are hereby incorporated by reference.

Because of the small size of the microspheres, it may be preferable to utilize the microspheres in masterbatch form. Any carrier resin may be suitable for such masterbatch— including ethylene vinyl acetate polymers and copolymers, or polyolefin polymers and copolymers of ethylene, propylene, a $C_4$ to $C_{12}$ α-olefin, and combinations thereof. The loading of microspheres in the masterbatch is preferably within the range from 40 to 80 wt % microspheres in carrier polymer, such as within the range from 50 to 70 wt %.

Further, although the microspheres may be blended with a TPV composition with the aid of compatibilizers (e.g., graft copolymers), as described in WO 2013/062685, in some embodiments of the present invention, it is preferred that the TPV composition be foamed with microspheres without the use of a compatibilizer (e.g., graft copolymers), as this avoids needless complication of the formulation, while still achieving excellent results in the foamed composition.

Finally, alternative foaming agents are contemplated in yet further embodiments. For instance, any chemical foaming agent may be suitable for practice of various embodiments of the present invention. Such chemical foaming agents decompose at elevated temperatures to form gases or vapors to blow the polymer into foam form. These agents allow reduction in cost of raw materials. The agent preferably takes a solid form, so it is conveniently dry-blended with the polymer material.

Chemical foaming agents include, but are not limited to, organic foaming agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. Specifically, the foaming agent can be azodicarbonamide. A gas, such as air, nitrogen, carbon dioxide, etc., may also be injected into the composition during the injection molding process. Examples of such alternative foaming agents can include those commercially available under the trade names HYDROCERAL® (Clariant International Ltd.), CELOGEN™ (Chemtura Corporation, Philadelphia, Pa., USA), GENITRON™, POROFOR™, FICEL™ (Lanxess AG, Germany), SUVA™, DYMEL™, FORMACEL™, ZYRON™ (DuPont Chemical Company, Wilmington, Del., USA), and PLANAGEN™ (INBRA S.A., Brazil).

Applications

Foamed TPV compositions in accordance with various embodiments may be suitable for forming any number of articles. Some non-limiting examples include automotive and industrial components such as weatherseals, glass run channels (all or any portion thereof, such as foot or base portions of such glass run channels), automotive boots and bellows (e.g., for steering and suspension), tubing, seals, gaskets, splines, air induction system ducts, consumer electronics (e.g., cabling or coating for wires), grips, and the like. Such compositions may be particularly suitable for applications in which low weight molded elastomeric polymer components are desired.

EXAMPLES

In order to provide a better understanding of the foregoing discussion, the following non-limiting examples are offered. Although the examples may be directed to specific embodiments, they are not to be viewed as limiting the invention in any specific respect.

Materials Used in Examples

"V3666" was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has an oil-extended Mooney Viscosity of 52 MU (ML 1+4, 125° C.; ASTM D1646). V3666 is commercially available from ExxonMobil Chemical Company, Houston, Tex.

"Santoprene 101-80" was Santoprene™ 101-80 thermoplastic vulcanizate having a density of 9.60 g/cc (ASTM D792), Shore A Hardness of 87 (ISO 868, 15 seconds and 23° C.), Compression Set of 36% (ASTM D395B, 70° C., 22 hr, Type 1) and 52% (ASTM D395B, 125° C., 70 hr, Type 1). Santoprene 101-80 is commercially available from ExxonMobil Chemical Company, Houston, Tex.

"VM3020" was Vistamaxx™ 3020 propylene-based elastomer which is a random propylene-ethylene copolymer with an ethylene content of 11 wt %. VM3020 has a density of 0.874 g/cc (ASTM D1505), a melt index of 1.1 g/10 min (ASTM D1238; 190° C. and 2.16 kg weight), a MFR of 3 g/10 min (ASTM D1238; 230° C. and 2.16 kg weight), a Shore D hardness of 34 (ASTM D2240), and a Vicat softening temperature of 68.3° C. VM3020 is commercially available from ExxonMobil Chemical Company, Houston, Tex.

"PP5341" was ExxonMobil™ PP5341 polypropylene which is a polypropylene homopolymer with a density of 0.9 g/cc and a MFR of 0.83 g/10 min (ASTM D1238; 230° C. and 2.16 kg weight). PP5341 is commercially available from ExxonMobil Chemical Company, Houston, Tex.

"PPF180A" is a polypropylene homopolymer commercially available from Braskem. PPF180A has a MFR of 17 g/10 min (ASTM D-1238; 230° C. and 2.16 kg weight).

"Clay" was Icecap™ K Clay.

"Zinc Oxide" or "ZnO" was Zoco 102 from Zochem, Inc.

"$SnCl_2$ MB" was an anhydrous stannous chloride polypropylene masterbatch. The $SnCl_2$ MB contained 45 wt % stannous chloride and 55 wt % of polypropylene having an MFR of 0.8 g/10 min (ASTM D1238; 230° C. and 2.16 kg weight).

"Black MB" was a carbon black masterbatch that contained 57.75 wt % polypropylene having an MFR of 35 g/10 min (ASTM D1238; 230° C. and 2.16 kg weight), 41.1 wt % carbon black, 1 wt % Kenamide S, and 0.25 wt % primary antioxidant.

"RIO" was a phenolic resin-in-oil curative that contained 30 wt % phenolic resin and 70 wt % oil.

"Oil" was Sunpar 150M paraffinic oil available from HollyFrontier Refining & Marketing LLC.

Test Methods

Shore A Hardness was measured using a Zwick automated durometer according to ASTM D2250 (15 sec. delay).

Ultimate tensile strength ("UTS"), modulus at 100% extension ("M100"), and ultimate elongation ("UE") were measured on injection molded plaques according to ASTM D-412 at 23° C. (unless otherwise specified) at 50 mm per minute by using an Instron testing machine. The plaques were 2 inches (5.08 cm)×4 inches (10.16 cm)×2 mm thickness.

Tension Set ("TS") was measured according to ASTM D-412 (Die C) using 100% strain at 70° C. for 22 hours, as described above.

Example 1

TPV compositions were prepared by dynamic vulcanization in a twin-screw extruder using the TPV formulations given in Table 1.

The thermoplastic resin, PBE, granulated rubber, clay, zinc oxide, $SnCl_2$ masterbatch, and carbon black masterbatch were added to the extruder at the feed throat. The phenolic resin-in-oil was injected into the extruder after the feed throat and initial mixing zone. A first portion ("Oil Up") of the free process oil was introduced to the extruder after the feed throat but before the phenolic resin-in-oil (curative) injection point, and a second portion ("Oil Down") of the free process oil was introduced to the extruder after the phenolic resin-in-oil injection point. Low molecular weight contaminants, reaction by-products, residual moisture and the like were removed by venting through one or more vent ports in the extruder, typically under vacuum, as needed. The final product was filtered using a melt gear pump and a filter screen of desired mesh size. A screw design with several mixing sections including a combination of forward convey, neutral, left handed kneading blocks and left handed convey elements to mix the process oil, cure agents and provide sufficient residence time and shear for completing cure reaction, without slip or surging in the extruder, were used.

TABLE 1

TPV Formulations (phr)

| TPV# | V3666 | Icecap K | ZnO | SnCl2 MB | CBMB | PP5341 | F180A | VM3020 | RIO | Oil Up | Oil down | Oil Up + Oil Down |
|---|---|---|---|---|---|---|---|---|---|---|---|---|
| TPV1 | 175 | 42 | 1.50 | 1.67 | 11 | 87 | 0 | 0 | 12.8 | 7.80 | 41.4 | 49.20 |
| TPV2 | 175 | 42 | 1.50 | 1.67 | 11 | 87 | 0 | 20 | 12.8 | 7.80 | 41.4 | 49.20 |
| TPV3 | 175 | 42 | 1.50 | 1.67 | 11 | 87 | 0 | 42.25 | 12.8 | 7.80 | 41.4 | 49.20 |
| TPV4 | 175 | 42 | 1.50 | 1.67 | 11 | 58 | 29 | 20 | 12.8 | 7.80 | 41.4 | 49.20 |
| TPV5 | 175 | 42 | 1.50 | 1.67 | 11 | 43.5 | 43.5 | 20 | 12.8 | 7.80 | 41.4 | 49.20 |
| TPV6 | 175 | 42 | 1.50 | 1.67 | 12.6 | 104 | 0 | 21.05 | 13.19 | 8.74 | 40.92 | 49.66 |
| TPV7 | 175 | 42 | 1.50 | 1.67 | 12.6 | 69.0 | 35 | 0 | 13.19 | 8.74 | 40.92 | 49.66 |
| TPV8 | 175 | 42 | 1.50 | 1.67 | 12.6 | 52.0 | 52 | 0 | 13.19 | 8.74 | 40.92 | 49.66 |
| TPV9 | 175 | 42 | 1.50 | 1.67 | 9.39 | 87 | 0 | 0 | 13.00 | 8.74 | 40.92 | 49.66 |
| TPV10 | 175 | 42 | 1.50 | 1.67 | 9.39 | 87 | 0 | 0 | 9.75 | 8.74 | 40.92 | 49.66 |
| TPV11 | 175 | 42 | 1.50 | 1.67 | 9.39 | 87 | 0 | 0 | 6.50 | 8.74 | 40.92 | 49.66 |
| TPV12 | 175 | 42 | 1.50 | 1.67 | 9.39 | 87 | 0 | 0 | 3.25 | 8.74 | 40.92 | 49.66 |
| TPV13 | 175 | 42 | 1.50 | 1.67 | 9.39 | 87 | 0 | 0 | 0 | 8.74 | 40.92 | 49.66 |
| TPV14 | 175 | 42 | 1.50 | 1.67 | 9.39 | 87 | 0 | 0 | 13 | 8.74 | 40.92 | 49.66 |
| TPV15 | 175 | 42 | 1.50 | 1.67 | 9.39 | 87 | 0 | 0 | 13 | 20 | 30 | 50 |
| TPV16 | 175 | 42 | 1.50 | 1.67 | 9.39 | 87 | 0 | 0 | 13 | 0 | 50 | 50 |
| TPV17 | 175 | 42 | 1.50 | 1.67 | 9.39 | 87 | 0 | 0 | 13 | 8.74 | 16.26 | 25 |
| TPV18 | 175 | 42 | 1.50 | 1.67 | 9.39 | 87 | 0 | 0 | 13 | 8.74 | 41.26 | 50 |
| TPV19 | 175 | 42 | 1.50 | 1.67 | 9.39 | 87 | 0 | 0 | 13 | 8.74 | 66.26 | 75 |
| TPV20 | 175 | 42 | 1.50 | 1.67 | 9.39 | 102 | 0 | 0 | 13 | 8.74 | 66.26 | 75 |
| TPV21 | 175 | 42 | 1.50 | 1.67 | 9.39 | 72 | 0 | 0 | 13 | 8.74 | 66.26 | 75 |
| TPV22 | 175 | 42 | 1.50 | 1.67 | 9.39 | 102 | 0 | 0 | 13 | 8.74 | 41.26 | 50 |
| TPV23 | 175 | 42 | 1.50 | 1.67 | 9.39 | 72 | 0 | 0 | 13 | 8.74 | 41.26 | 50 |
| TPV24 | 175 | 42 | 1.50 | 1.67 | 9.39 | 102 | 0 | 0 | 13 | 8.74 | 16.26 | 25 |
| TPV25 | 175 | 42 | 1.50 | 1.67 | 9.39 | 72 | 0 | 0 | 13 | 8.74 | 16.26 | 25 |

Hardness, specific gravity, and tensile properties were measured for injection molded plaques formed from each of the TPV compositions, as reported in Table 2 below. Each reported value represents the mean of various repeated measurements for each TPV composition (Specific gravity: 2 measurements; Hardness: 5 measurements; UTS, UE, and M100 each a mean of 3 measurements).

TABLE 2

Properties of TPV Compositions

| TPV# | Hardness (Shore A) | UTS (MPa) | UE (%) | M100 (MPa) | Specific Gravity (g/cc) |
|---|---|---|---|---|---|
| TPV1 | 79.8 | 8.52 | 555 | 4.64 | 0.964 |
| TPV2 | 84.6 | 9.56 | 571 | 5.09 | 0.964 |
| TPV3 | 84.6 | 9.88 | 635 | 4.89 | 0.948 |
| TPV4 | 84.4 | 9.1 | 719 | 4.81 | 0.960 |
| TPV5 | 84.8 | 9.5 | 634 | 4.93 | 0.957 |
| TPV6 | 86.8 | 11.16 | 780 | 5.86 | 0.958 |
| TPV7 | 87.2 | 10.99 | 730 | 5.45 | 0.956 |
| TPV8 | 86.4 | 9.06 | 561 | 5.52 | 0.958 |
| TPV9 | 84.4 | 8.56 | 623 | 4.61 | 0.960 |
| TPV10 | 85.4 | 9.3 | 689 | 4.6 | 0.966 |
| TPV11 | 84.4 | 8.81 | 678 | 4.57 | 0.968 |
| TPV12 | 85.8 | 8.21 | 711 | 4.5 | 0.968 |
| TPV13 | 82.6 | 5.78 | 894 | 3.89 | 0.968 |
| TPV14 | 84.6 | 8.6 | 590 | 4.61 | 0.968 |
| TPV15 | 84.4 | 10.31 | 685 | 4.68 | 0.972 |
| TPV16 | 84.6 | 8.76 | 593 | 4.59 | 0.960 |
| TPV17 | 86.6 | 10.28 | 647 | 5.21 | 0.970 |
| TPV18 | 84.6 | 8.34 | 570 | 4.68 | 0.965 |
| TPV19 | 80.6 | 8.42 | 635 | 4.27 | 0.948 |
| TPV20 | 81.6 | 9.24 | 653 | 5.04 | 0.951 |
| TPV21 | 84 | 8.02 | 561 | 4.66 | 0.956 |
| TPV22 | 87 | 10.15 | 707 | 5.07 | 0.963 |
| TPV23 | 84.2 | 8.06 | 655 | 4.14 | 0.957 |
| TPV24 | 89.4 | 11.06 | 725 | 5.64 | 0.962 |
| TPV25 | 84.8 | 10.21 | 709 | 4.99 | 0.970 |

Various of the TPV compositions were compared to determine optimum composition for the desired improvement to pre-foam tensile properties, while minimizing increases to hardness.

Figure 1:
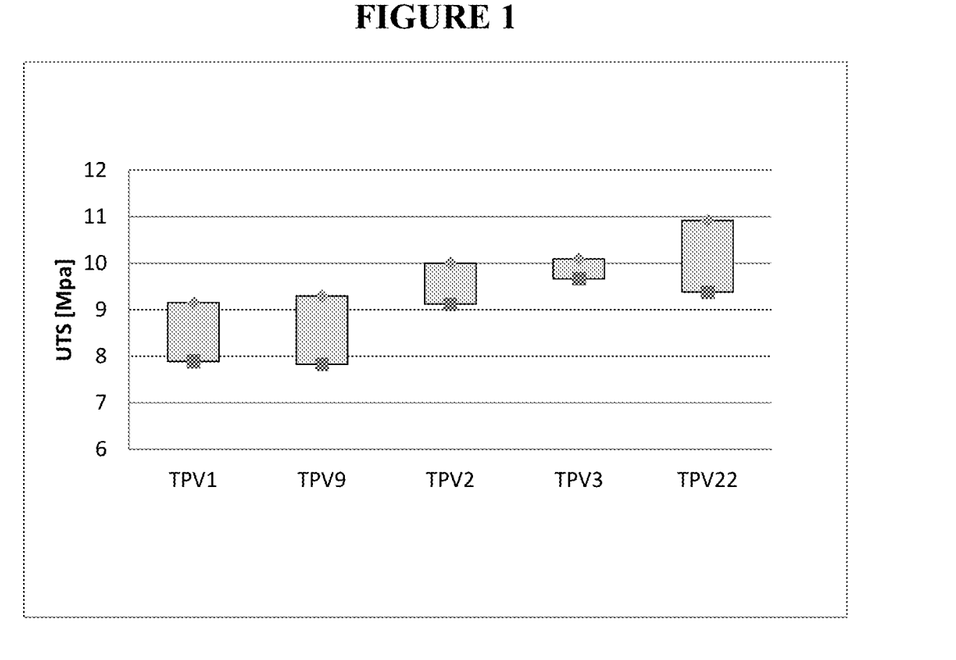
FIG. 1 is a graph showing ultimate tensile strength values for some TPV compositions in connection with Example 1.

FIG. 1 highlights some pertinent comparisons among TPV compositions TPV1, TPV9, TPV2, TPV3, and TPV22, which have variations in the thermoplastic phase (e.g., some different total amounts of thermoplastic resin+PBE, and some similar amounts of total thermoplastic resin+PBE, but with different relative amounts of thermoplastic and PBE). FIG. 1 shows data points with 95% confidence interval bars for the measured value, based upon three repeated measurements, calculated using the embedded confidence interval function in Microsoft™ Excel 2013 software. From FIG. 1, one can see that formulations with more plastic tend to have higher UTS. For instance, both TPV2 and TPV22 contain about 102 PHR plastic (polypropylene+PBE), but TPV2 has 20 phr PBE while TPV22 contains only PP (no PBE). Although UTS is slightly reduced in TPV2 (having the PBE), it is still nearly as high as TPV22, substantially overlapping in the 95% CI range, while still being plainly higher than the UTS of TPV1 and TPV9 (having less total plastic, but otherwise being similar). Further, the UTS increase holds true for addition of more PBE, as illustrated with TPV3, which is similar to TPV2 except for the inclusion of 22.25 phr additional PBE, and having overlapping but slightly higher UTS as compared to TPV2.

Figure 2:
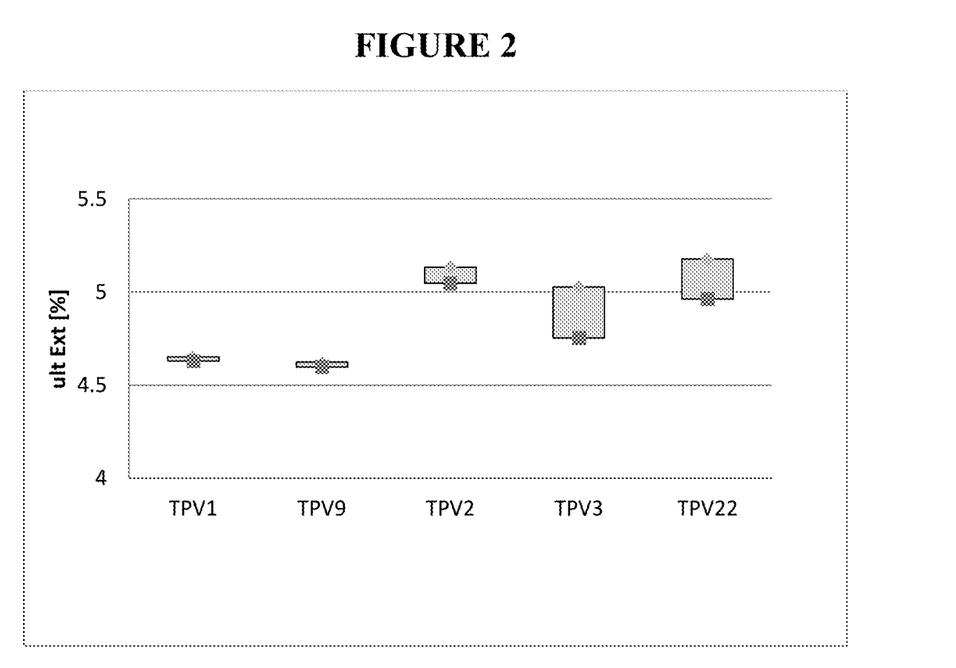
FIG. 2 is a graph showing ultimate extension values for the TPV compositions of FIG. 1.

FIG. 2 shows that the same trend holds for TPV2, TPV3, and TPV22's Ultimate Extension, as compared to TPV1 and TPV9. FIG. 2, like FIG. 1, shows data points with 95% CI bars for the measured values, based on three repeated measurements.

Figure 3:
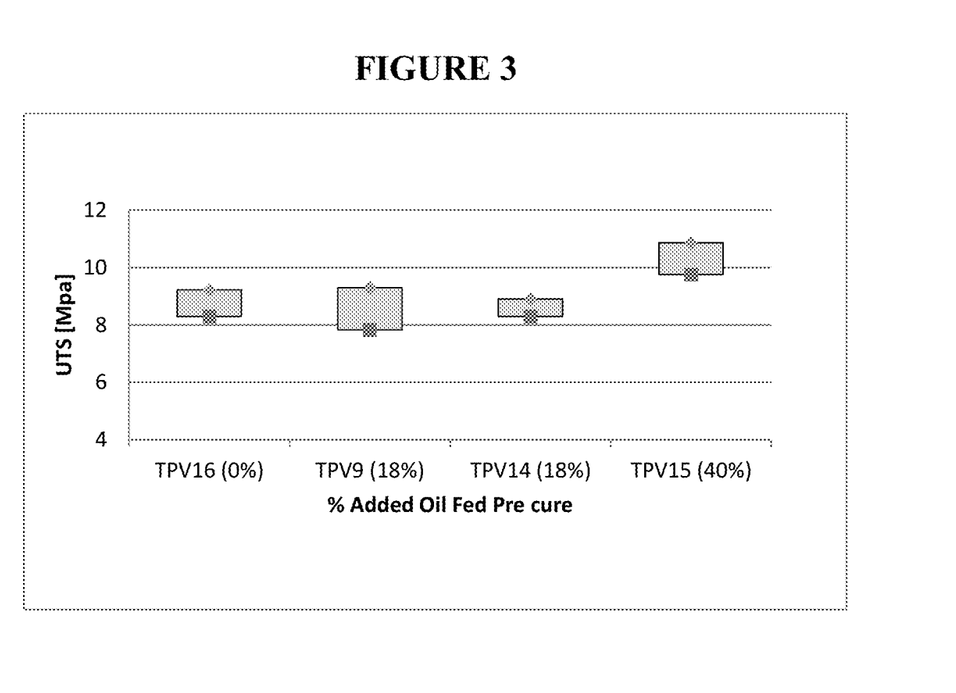
FIG. 3 is a graph showing ultimate tensile strength values for some other TPV compositions in connection with Example 1.
Figure 4:
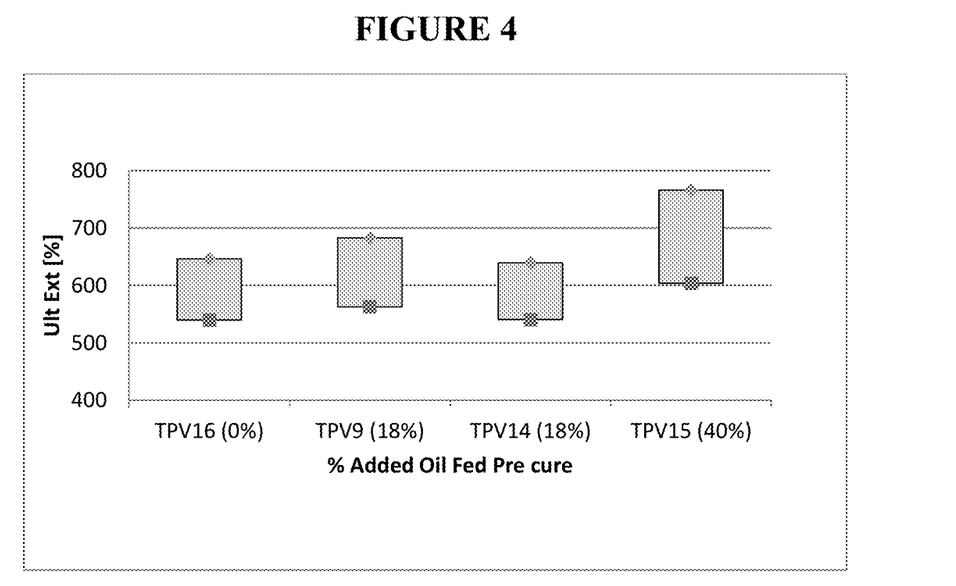
FIG. 4 is a graph showing ultimate extension values for the TPV compositions in FIG. 3.

FIGS. 3 and 4 highlight a different comparison regarding the effects of preloading oil. TPV16, TPV9, TPV14, and TPV15 were compared. Each of these TPV compositions was made from the same relative amounts of ingredients, including 50 phr added process oil and 12.8 phr resin-in-oil. TPV16 had 0% preloaded oil (i.e., all process oil was added after resin-in-oil curative); TPV9 and TPV14 each had 18% preloaded oil (meaning 18 wt % of the 50 phr process oil was added prior to the resin-in-oil curative), and TPV15 had 40% preloaded oil. FIGS. 3 and 4 respectively show values for UTS and ultimate elongation (each including 95% CI bars based on 3 repeated measurements). TPV15, having 40% preloaded oil, provides the best tensile properties. In addition, as shown in Table 2, the hardness of all four TPV compositions was roughly the same (84.4-84.6 Shore A).

Figure 5:
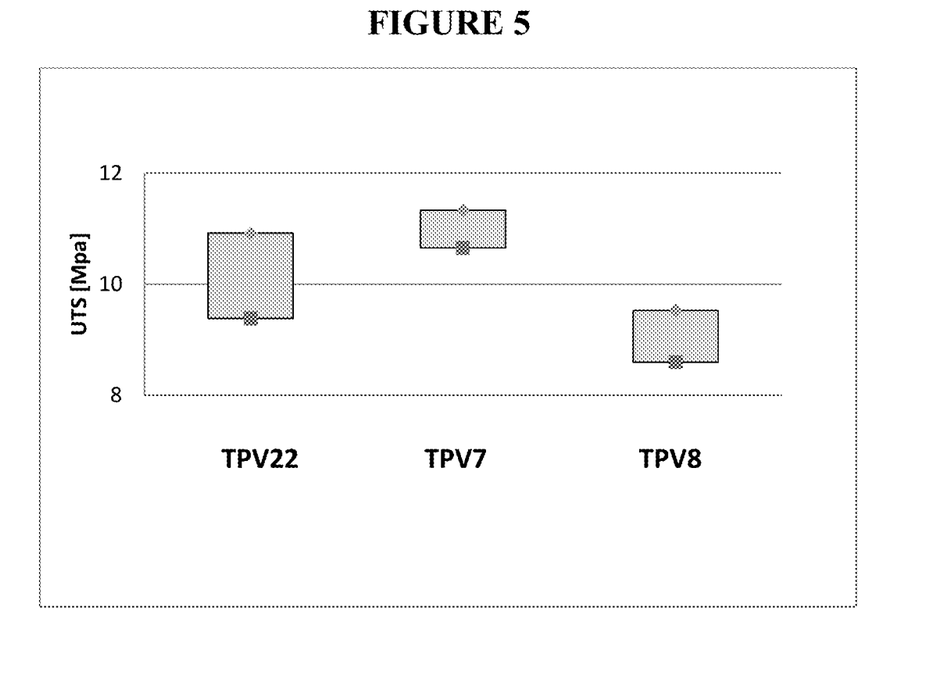
FIG. 5 is a graph showing ultimate tensile strength values for yet further TPV compositions in connection with Example 1.
Figure 6:
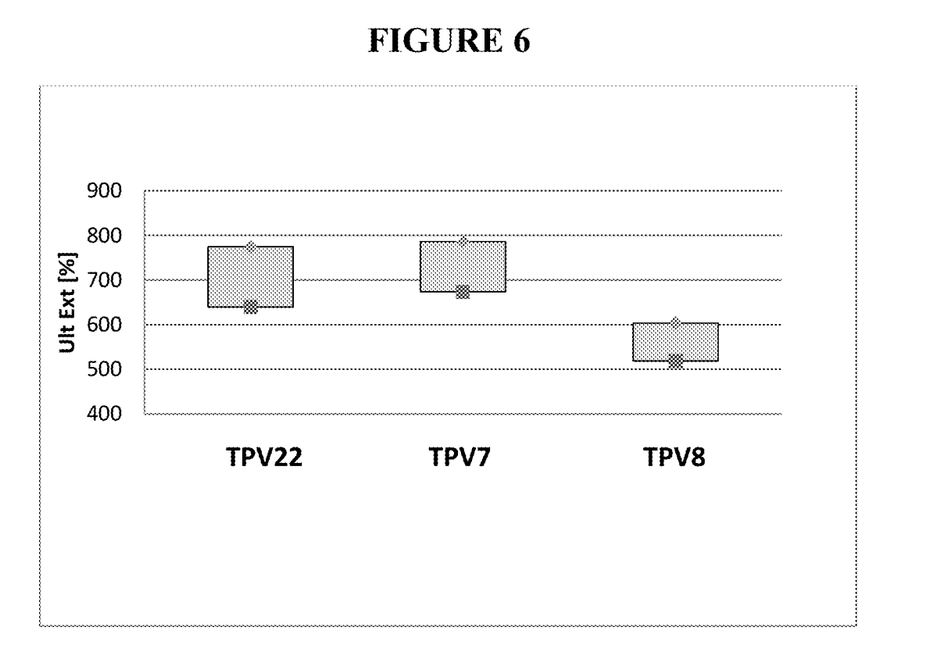
FIG. 6 is a graph showing ultimate extension values for the TPV compositions in FIG. 5.

FIGS. 5 and 6 are useful for evaluating the impact of replacing some of the PP5341 (low-MFR polypropylene) with F180A (a high-MFR polypropylene) in the thermoplastic phase. As with FIGS. 1-4, FIGS. 5 and 6 indicate values of UTS and UE, respectively, shown as 95% CI bars based on three repeated measurements. TPV22 (having all PP5341) was compared with TPV7 (having a 67/33 by weight split of PP5341 and F180A) and TPV8 (having equal weight of each polypropylene, i.e., a 50/50 split). The comparison indicates that, where a high-MFR thermoplastic like F180A is to be included in the TPV formulation, there should be a greater amount of low-MFR thermoplastic than high-MFR thermoplastic. Both TPV22 (all low-MFR polypropylene) and TPV7 (67/33 mix of low-MFR/high-MFR) outperformed the TPV8 (50/50 split) in ultimate extension and ultimate tensile strength.

Example 2

Figure 7:
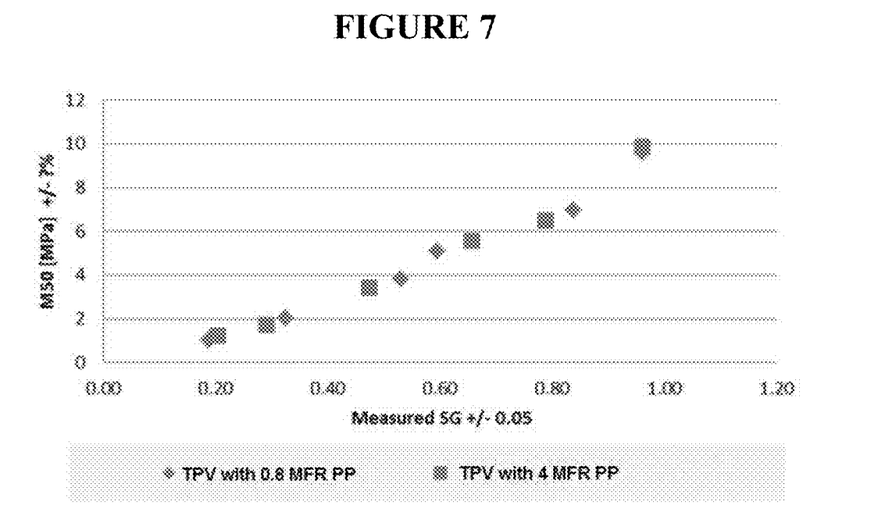
FIG. 7 is a graph showing modulus at 50% strain for foamed and non-foamed TPV compositions in connection with Example 2.

TPVs with the same formulation, except two different types of polypropylene, were each foamed by coextruding into tapes using different amounts of EXPANCEL™ 951 MB120 thermo-expandable microsphere masterbatch (0 wt %, 0.5 wt %, 1.0 wt %, 2.0 wt %, 4.0 wt %, 8.0 wt %). One polypropylene was 0.8 MFR homopolypropylene (PP5341, described above); the other was a different homopolypropylene having 4 MFR, a broader molecular weight distribution (Mw/Mn), and extensional strain-hardening (which is not present in PP5341). The M50 (same as modulus at 100% (i.e., M100), except taken at 50% strain, otherwise measured identically) was measured for each of these 12 foamed TPV compositions, as was specific gravity. FIG. 7 is a plot of M50 as a function of specific gravity for these foamed TPVs. As shown in FIG. 7, M50 decreased proportionally with decreasing specific gravity (that is, the tensile property M50 decreased proportionally with the extent of foaming, where greater foaming is considered to be indicated by decreased specific gravity).

Similarly, a uniform TPV formulation was foamed multiple times with varying wt % (0, 0.5, 1.0, 2.0, 4.0, and 8.0 wt %) of multiple different types of EXPANCEL™ thermo-expandable microsphere masterbatch (980 MB 120, 930 MB 120, 951 MB 120, and 950 MB 80).

Figure 8:
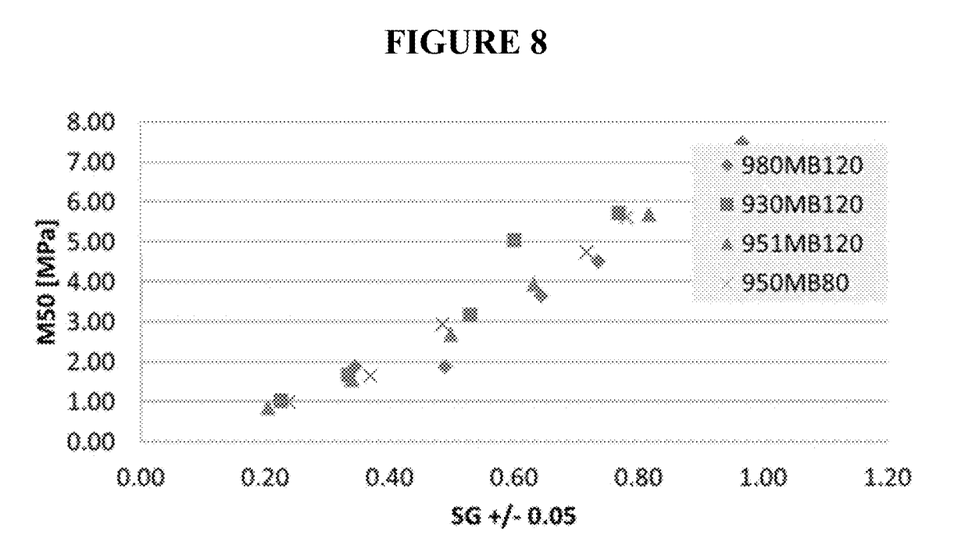
FIG. 8 is a graph showing modulus at 50% strain for a TPV composition foamed multiple times with varying amounts of different types of thermo-expandable microsphere masterbatch, also in connection with Example 2.

These different commercial thermo-expandable microspheres differ in active temperature range and particle size. FIG. 8 shows a plot of M50 of the foamed TPV compositions as a function of specific gravity; the same trend is apparent, wherein greater foaming (i.e., decreased specific gravity) let to a proportional decrease in the M50 tensile property, even using the different thermo-expandable microsphere foaming agents.

Example 3

Example 3 evaluates the effect of modifying commercial TPV compositions with propylene-based elastomer (such as Vistamaxx™ propylene-based elastomers) prior to adding a foaming agent. 5 wt % and 10 wt % of Vistamaxx 3020 was blended with Santoprene 101-80 in a twin screw extruder. The extruder was set at 30 RPM, temperature in Zone 1 was 155° C., Zone 2 was 165° C., Zone 3 was 185° C., Zone 4 was 195° C., Die Temperature 1 was 185° C., Die Temperature 2 was 190° C., and the Die type was a 10 mm land length. Microsphere Expancel 950 MB80 was added to the extruder. Properties of foamed TPVs are reported in Table 3 below.

TABLE 3

TPV Formulations (wt %) and Properties

| Sample | Formulation (wt %) | Density (g/cc) | 25M (MPa) | 100M (MPa) | Tensile Strength (MPa) | Elongation (%) | Tear Strength (MPa) | Compr. Set (%) |
|---|---|---|---|---|---|---|---|---|
| A | 98 wt % Santoprene 101-80 and 2 wt % 950MB80 | 0.74 | 2.43 | 3.2 | 5.0 | 357 | 24.9 | 52 |
| B | 97 wt % Santoprene 101-80 and 3 wt % 950MB80 | 0.63 | 2.00 | 2.5 | 3.6 | 308 | 21.2 | 52 |
| C | 98 wt % (95 wt % Santoprene 101-80 and 5 wt % Vistamaxx 3020) and 2 wt % 950MB80 | 0.65 | 2.24 | 2.8 | 4.5 | 382 | 26.6 | 56 |
| D | 98 wt % (90 wt % Santoprene 101-80 and 10 wt % Vistamaxx 3020) and 2 wt % 950MB80 | 0.64 | 2.16 | 2.7 | 4.6 | 420 | 27.2 | 53 |

As shown in Table 3, with the same amount of microsphere (2 wt %), formulations with Vistamaxx 3020 had lower density compared with formulations without Vistamaxx. Adding more microsphere (3 wt %) to Santoprene without adding Vistamaxx also resulted in formulations with lower density but compromised other physical properties. Properties did not dramatically improve with the addition of 10 wt % Vistamaxx (as opposed to 5 wt %), indicating to that formulations with greater than about 10 wt % Vistamaxx do provide additional improvement to physical properties foamed TPVs. Overall, Table 3 indicates that adding Vistamaxx to Santoprene improves foaming efficiency as well as elongation and tear strength.

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A method comprising:
   (a) combining 90 to 99.9 wt % of a thermoplastic vulcanizate (TPV) composition with 0.1 to 10 wt % of a foaming agent, said wt % s based on the combined weight of TPV composition and foaming agent; and
   (b) forming a foamed TPV composition therefrom;
   wherein the thermoplastic vulcanizate comprises: (i) an at least partially vulcanized rubber component dispersed within a continuous thermoplastic component comprising thermoplastic resin and propylene-based elastomer; (ii) process oil; and (iii) one or more additives;
   wherein the foaming agent comprises thermo-expandable microspheres; and
   wherein the TPV is made by a process in which 25 to 50 wt % of the process oil in the TPV composition is preloaded into a TPV formulation before a curative is added to the TPV formulation.

2. The method of claim 1, wherein the propylene-based elastomer (PBE) has at least 60 wt % units derived from propylene and the balance derived from ethylene and/or one or more $C_4$ to $C_{10}$ comonomers;
   and further wherein the PBE has the following properties:
   (i) melt flow rate (MFR) of 1 to 5 g/10 min (ASTM D-1238, 230° C. and 2.16 kg), (ii) melting point ($T_m$) of 105° C. or less, and (iii) heat of fusion ($H_f$) within the range from 1 to 80 J/g.

3. The method of claim 1, wherein the foaming agent comprises a masterbatch of thermo-expandable microspheres comprising 5 to 95 wt % thermo-expandable microspheres in a carrier polymer, said wt % based on the total weight of the masterbatch.

4. The method of claim 1, wherein the rubber component comprises ethylene-propylene-diene (EPDM) terpolymer, and the thermoplastic resin comprises homopolypropylene.

5. The method of claim 1, wherein the thermoplastic resin is polypropylene having MFR within the range from 0.1 to 5 g/10 min (ASTM D-1238, 230° C. and 2.16 kg).

6. The method of claim 5, wherein the thermoplastic component of the TPV composition further comprises a second thermoplastic resin having MFR of greater than 15 g/10 min (ASTM D-1238, 230° C. and 2.16 kg).

7. The method of claim 6, wherein the thermoplastic resin comprises 51 to 99 wt % of the combined total weight of the thermoplastic resin and the second thermoplastic resin in the TPV composition.

8. The method of claim 1, wherein the TPV composition has one or more of the following properties:
   (i) Hardness within the range from 80 to 87 (Shore A);
   (ii) Modulus at 100% elongation ("M100") within the range from 7 to 12 MPa;
   (iii) Ultimate tensile strength (UTS) within the range from 9 to 12 MPa; and
   (iv) Ultimate elongation within the range from 500% to 800%.

9. The method of claim 1, wherein the foamed TPV composition has one or more of the following properties when the foamed TPV composition has specific gravity within the range from 0.68 to 0.70 g/cc:
   (i) M100 within the range from 3.00 to 3.75 MPa;
   (ii) UTS within the range from 2.50 to 6.00 MPa; and
   (iii) Tension Set ("TS") within the range from 70% to 100%.

10. A foamed TPV composition made by the method of claim 1.

11. An article made from the foamed TPV composition of claim 10.

12. A method comprising:
   (a) dynamically vulcanizing a TPV formulation comprising rubber, thermoplastic component, propylene-based elastomer, one or more additives, process oil, and curative, so as to obtain a TPV composition; comprising
       (a-1) mixing the rubber component, thermoplastic component, propylene-based elastomer, and, optionally, one or more additives selected from the group consisting of cure accelerators, fillers, pigments, antioxidants, and combinations thereof, so as to form a solids blend;
       (a-2) mixing the solids blend at a temperature above the melt temperature of the thermoplastic resin so as to form a molten blend;
       (a-3) adding a preloading amount of the process oil to the solids blend or the molten blend, wherein the preloading amount of the process oil is within 25 to 50 wt % of the total process oil added to the solids blend and the molten blend;
       (a-4) after adding the preloading amount of the process oil, adding the curative to the molten blend; and
       (a-5) after or while adding the curative to the molten blend, adding a further amount of the process oil to the molten blend; and
   (b) forming a foamed TPV composition therefrom by combining 90 to 99.9 wt % of the TPV composition with 0.1 to 10 wt % of a foaming agent, said wt % s based on the combined weight of the TPV composition and foaming agent.

13. The method of claim 12, wherein the curative comprises a phenolic resin, and further wherein the one or more additives comprise one or more cure accelerators.

14. The method of claim 13, wherein the curative comprises a phenolic resin in oil.

* * * * *